United States Patent
Devillard et al.

(10) Patent No.: US 10,178,021 B1
(45) Date of Patent: Jan. 8, 2019

(54) CLUSTERED ARCHITECTURE DESIGN

(71) Applicant: Amazon Technologies, Inc., Seattle, WA (US)

(72) Inventors: Emmanuel Pierre Devillard, Issaquah, WA (US); Daniel Vassallo, Seattle, WA (US); Nitin Kesarwani, Seattle, WA (US); Robert Mark Waugh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 408 days.

(21) Appl. No.: 14/981,646

(22) Filed: Dec. 28, 2015

(51) Int. Cl.
*G06F 15/173* (2006.01)
*H04L 12/715* (2013.01)
*H04L 12/24* (2006.01)
*H04L 12/707* (2013.01)

(52) U.S. Cl.
CPC .......... *H04L 45/46* (2013.01); *H04L 41/0816* (2013.01); *H04L 45/22* (2013.01)

(58) Field of Classification Search
CPC   H04L 41/0813; H04L 41/50; G06F 17/30598
USPC ......................................................... 709/238
See application file for complete search history.

(56) References Cited

U.S. PATENT DOCUMENTS

| 2007/0050519 A1* | 3/2007 | Cano | H04L 67/1095 |
| | | | 709/238 |
| 2016/0205179 A1* | 7/2016 | Cui | G06F 9/5083 |
| | | | 709/226 |

* cited by examiner

*Primary Examiner* — Tauqir Hussain
(74) *Attorney, Agent, or Firm* — Knobbe Martens Olson & Bear LLP

(57) ABSTRACT

Systems and methods are provided for organizing data channels and processing hosts included in a system into clusters. A cluster management service may receive data from a steam of data and may route the data to a cluster associated with the data stream. A data channel routing service included in the cluster may route the data to the set of processing hosts included in the cluster through multiple data channels included in the cluster. In some instances, the data channel routing service may use any of the data channels to send data to the set of processing hosts. Because incoming data may be distributed among multiple data channels, the cluster may experience less congestion. Further, the system may also process the stream of data using the same processing hosts by routing the stream of data to the same cluster, thereby avoiding split processing of the data stream.

22 Claims, 8 Drawing Sheets

CLUSTERED ARCHITECTURE DESIGN

BACKGROUND

Generally described, computing devices and communication networks can be utilized to exchange information. In a common application, a device can exchange information with other devices via the communication network. For example, a user at a personal computing device can utilize a software browser application to request a Web page or Web application from a server device via the Internet. For another example, a user of a content providing service can utilize a display device (e.g., television, computer, mobile device, smartphone, tablet) to request content (e.g., an audio presentation, video presentation, audiovisual presentation, movie, television show, video, podcast) to be downloaded or streamed from a server device via the Internet to the display device. In a further embodiment, the client devices can transmit a set of data, generally referred to as a data stream, to a network-based device for analysis or additional processing.

Illustratively computing systems can be configured to analyze streaming data received from computing devices. In a common application, the computing devices can provide a stream of data to such a computing system. In turn, the receiving computing system can process the stream of data to determine various features, patterns, statistics, or metrics related to the stream of data. For example, a mobile computing device may continually generate and transmit streaming data that includes location data. Accordingly, the computing system may continually receive the location information data stream and process the received location over the course of several days to determine travel patterns of the user of that mobile computing device.

In another example, computing devices can continually track the occurrence of certain events, such as the occurrence of errors, user-initiated actions, state information, and the like. For example, computing devices can generate a listing of event data, often referred to as a log of events. Additionally, in some embodiment, the computing devices can transmit log data as part of a data stream to a computing system for analysis. The computing system can then analyze the stream of log events to determine various values, patterns, or other metrics that may characterize the events represented in the stream of log events.

BRIEF DESCRIPTION OF THE DRAWINGS

Many of the attendant advantages of aspects described herein will become more readily appreciated as the same become better understood by reference to the following detailed description, when taken in conjunction with the accompanying drawings, wherein.

DETAILED DESCRIPTION

Figure 1A:
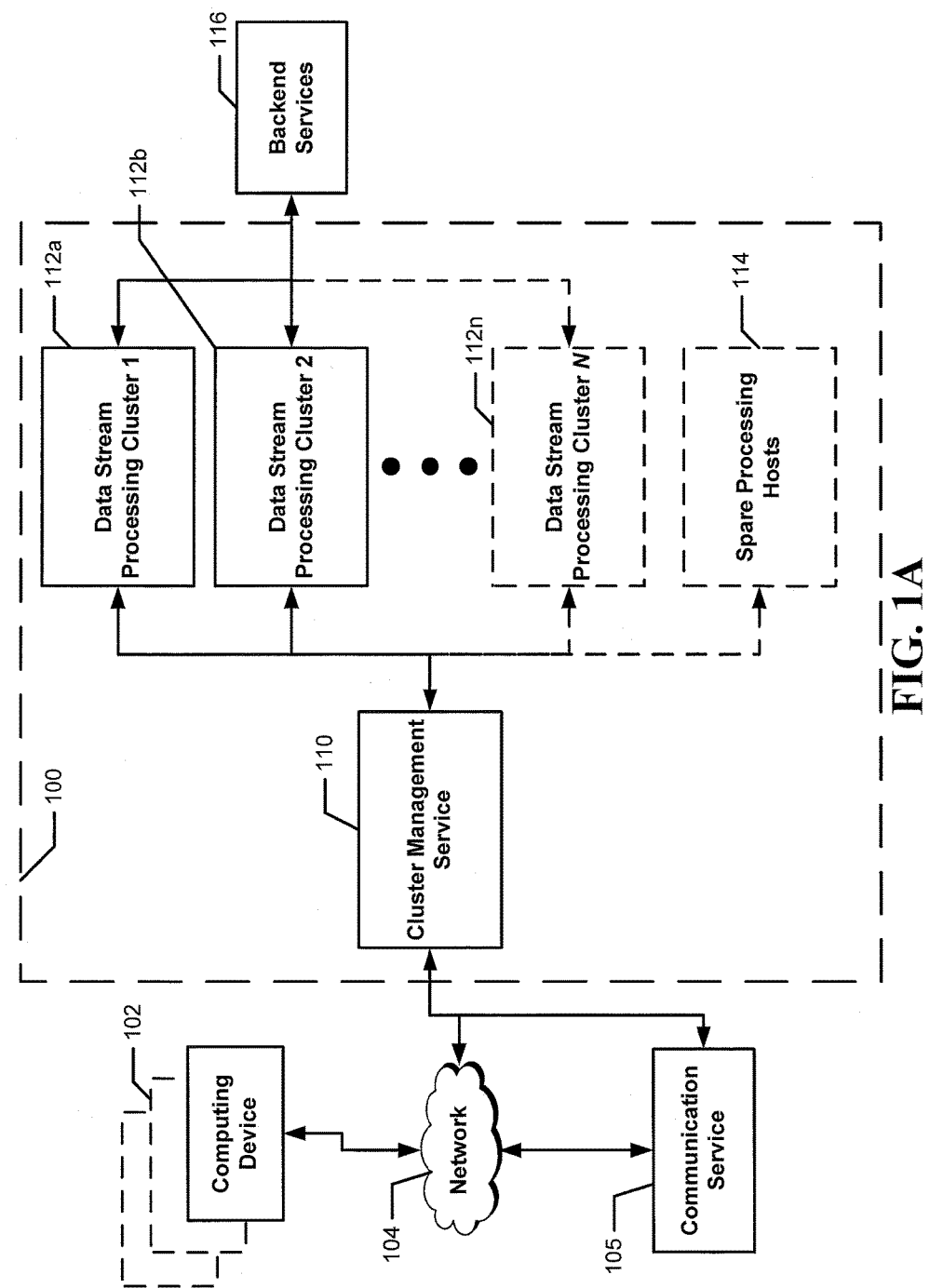
FIG. 1A is a system block diagram of a configuration of a system for processing streams of data using multiple data stream processing clusters, according to some embodiments.

In overview, aspects of the present disclosure include systems and methods for organizing data channels and processing hosts into data stream processing clusters (sometimes referred to herein generally as "clusters"). Illustratively, in various embodiments, a data management system may include a plurality of data stream processing clusters and a cluster management service. The cluster management service may receive data belonging to a stream of data, identify a data stream processing cluster related to the stream of data based on a cluster-level routing configuration, and route the data to the identified cluster.

Illustratively, each data stream processing cluster may include a set of processing hosts exclusive to that data stream processing cluster, as well as multiple data channels in communication with the set of processing hosts. The cluster may also include a data channel routing service that may be configured to receive data from the cluster management service and route the data to the set of processing hosts through the multiple data channels, according to channel-level routing configurations.

Streams of data may include a sequence of data records that may arrive at different points in time. As a result, the system may attempt to utilize the same processing hosts to process data records associated with the same data stream in order to maintain the locality of data stream. Specifically, the same set of processing hosts may process a stream of data relatively more efficiently than two separate sets of processing hosts as the two set of processing hosts may need to consolidate or exchange data because each of the two separate sets of processing hosts may be missing a portion of the entire data stream. As such, maintaining the locality of a data stream by routing that data stream to the same set of processing hosts may be more efficient than splitting the data stream between different sets of processing hosts.

In order to ensure that the same set of processing hosts is able to obtain the same data stream, the system may use the same data channel to route a data stream to the same set of processing hosts. For example, a set of processing hosts may obtain data streams only through one particular data channel. Given the limited throughput capacity of individual data channels, maintaining the locality of a data stream may cause an individual data channel to become congested in the event that individual data channel is handling data in excess of its maximum throughput capacity.

Depending on the channel-level routing configuration, the data channel routing service selects from a plurality of available data channels to send data to the set of processing hosts because the set of processing hosts may receive data via any of the data channels within the cluster. Because incoming data may be distributed among multiple data channels in the cluster, the cluster (and the system as a whole) may experience comparatively less congestion. At the same time, the system may also maintain the locality of a stream of data by routing the stream of data to the same cluster, which utilizes the same set of processing hosts to analyze or process the same stream of data.

For ease of description, various embodiments may be described with reference to a "stream of data" or a "data stream." As used herein, the terms "stream of data" and "data stream" are used interchangeably and generally refer to a sequence of data received by the system. According to some embodiments, data may include "data records," and a sequence of multiple data records may comprise a data stream. Data records may generally refer to any known way of organizing data, for example, as discrete packets of data, batches, or collections of data packets, or whole files. By way of a non-limiting example, a data record may be a log event, and a sequence of log events may be referred to as a "log stream." In this example, a log event may correspond to information regarding an event or occurrence that occurs or is detected on a computing device. For example, a log event may be related to detecting an error, completing, or performing an operation or transaction, receiving user input data, receiving or transmitting a message or data, or any of various other occurrences or events that are capable of detection or measurement on a computing device. In some embodiments, the system may receive data of a data stream (e.g., log events in a log stream) in sequential order, out of sequential order, or in batches of data records received simultaneously or nearly simultaneously.

According to various embodiments, a cluster management service may generally be configured to receive an incoming data record, and the cluster management service may determine to which data stream the incoming data record belongs. For example, data records associated with the same user, the same account, the same computing device, or the like may be considered as belonging to the same data stream. In other examples, the may determine a data stream associated with a data record based at least in part on information regarding an association between the data stream processing cluster and at least one of a sender of the data record, an owner of the data record, a data stream of the data record, an attribute of the data record, or some other metadata of the data record. In some embodiments, the cluster management service may associate a data stream with one or more data record processing clusters. Thus, in response to receiving the incoming data record, the cluster management service may identify the data stream associated with an incoming data record. The cluster management service may then select, from multiple clusters, a cluster associated with the identified data stream. The cluster management service may route the incoming data record to the selected cluster from one or more sources.

In some embodiments, the cluster management service may select the cluster by referring to cluster-level routing configuration information, which may include information related to the clusters that are associated or assigned with particular data streams. For example, the cluster-level routing configuration information may include a look-up table, and the cluster management service may utilize the identification of a data stream to look up the corresponding cluster that is designated to receive data records from that data stream. Thus, the cluster management service may maintain the locality of data streams by routing data from these streams to the same clusters, which, as further described herein, include the same processing hosts. In some embodiments, a data stream may be associated with multiple clusters, and the cluster management service may route the data record to one of the multiple clusters.

In some embodiments, one or more processing hosts not associated with a cluster may function as a set of processing hosts that are able to join a cluster when a processing host fails or is otherwise unavailable, which can generally be referred to as a set of spare processing hosts. In such embodiments, a spare processing host from the set of spare processing hosts may dynamically replace a failed or failing processing host in a cluster without intervention by the cluster management service. Particularly, each processing host associated with a cluster (e.g., a processing host that is not a spare processing host) may periodically notify other processing hosts (e.g., the set of spare processing hosts) that it is still operating correctly. Each processing host associated with a cluster may periodically update a value in a table or other data structure that is accessible by spare processing hosts in order to indicate that the processing host is operating correctly. For example, a processing host may update a value in the table with a time stamp, and spare processing hosts may determine that this processing host is still operational in the event that the time stamp value is within a certain period of time (e.g., the time stamp has not expired based on a threshold time period). However, once a spare processing host determines that a processing host associated with a cluster has failed (e.g., based on the stale information included in the table), the spare processing host may dynamically replace the failed processing host in the cluster and may indicate to other spare processing hosts that the failed processing host has been replaced. By way of an example, a spare caching host may determine that a caching host in a cluster has failed, and in response, the spare caching host may replace the failed caching host in the cluster and may notify other spare caching hosts, such as by updating the table to reflect the replacement of the failed processing host in the cluster.

The cluster management service may, according to some embodiments, dynamically manage the number or type of processing hosts that are associated with a cluster. In such embodiments, the cluster management service may determine a number of processing hosts (or a number of processing hosts having a certain type) to associate with a cluster based on performance information associated with the cluster. In particular, this performance information may include information regarding the performance of individual components within the cluster, such as the performance of one or more of the processing hosts. In some embodiments, the cluster management service may receive this performance information from the data channel routing service operating within the cluster, as described further herein. The cluster management service may also (or alternatively), determine the number of processing hosts (or the number of processing hosts of a certain type) to associate with a cluster based at least in part on a determination or estimation of a volume of data records that the cluster will receive, handle, or process. For example, the cluster management service may determine a data throughput of one or more data streams. Based on the determined data throughput, the cluster management service may create a new data stream processing cluster or modify an existing cluster to include the number and types of processing hosts that may be suitable for handling the determined data throughput. For example, in response to determining that the data throughput of the one or more data streams associated with a cluster has increased or will increase, the cluster management service may increase the number of processing hosts that are associated with that cluster or, specifically, may increase the number of processing hosts of a certain type that may be needed to handle the additional data throughput (e.g., additional metrics-generating processing hosts). In some embodiments, the cluster management service may determine to increase or decrease the number of processing hosts based on the type of processing host, such as by increasing the number of archiving hosts in the event that the cluster requires additional processing hosts to archive the data records processed by that cluster.

In some embodiments, the cluster management service may utilize the table or other data structure described above to indicate that one or more processing hosts may join the cluster. As such, one or more processing hosts from the set of spare processing hosts may reference the table or other data structure to determine that the cluster has one or more open positions (sometimes referred to herein as "slots"). The one or more processing hosts may then join that cluster, for example, by updating the table or other data structure to reflect their association with the cluster. In some additional (or alternative) embodiments, the cluster management service may decrease the number of processing hosts associated with a cluster by updating the table to indicate that one or more of the processing hosts associated with the cluster is no longer associated with that cluster, such as by reducing the number of slots associated with the cluster. In response, the one or more processing hosts removed from the cluster may reference the table to determine that they are no longer part of the cluster. As a result, the one or more processing hosts may join the set of spare processing hosts and may monitor for available positions in other clusters.

In some embodiments in which a data stream is associated with more than one cluster, the cluster management service may route an incoming data record to one of the multiple clusters. In such embodiments, the cluster management service may select which of the multiple clusters to send an incoming data record based on the cluster-level routing configuration information. For example, the cluster-level routing configuration information may indicate one or more rules for the cluster management service to follow when making the determination, such as sending the incoming data record to a cluster having the highest capacity to handle an incoming data record or sending the incoming data record to one of the multiple clusters in a randomized manner.

In some embodiments, the cluster management service may update or modify the cluster-level routing configuration information to account for new data streams that have not been previously associated with a cluster. For example, the cluster management service may receive a data record from a new user that has not previously registered with the system. In response, the cluster management service may determine that the data stream is not accounted for in the cluster-level routing configuration information. The cluster management service may designate one or more of the clusters in the system to receive data from the new user's data stream and may update the cluster-level routing configuration information accordingly.

In some additional (or alternative) embodiments, the cluster management service may dynamically adjust the cluster-level routing configuration information to account for the current loads of the clusters in the system. In particular, the cluster management service may monitor or obtain load information from the clusters in the system. The load information may include information related to the performance of various components within the cluster. For example, the load information may describe the current volume of data the cluster is receiving or processing in comparison to a desired threshold volume of data. Additionally, the cluster management service may monitor or obtain information regarding the data throughput of data streams as part of determining the load information for the clusters in the system. The cluster management service may utilize the data throughput information to identify one or more data streams that may have a relatively high data throughput, which may correspond to a relatively high load experienced by the one or more clusters that process data records from those identified streams.

In response to determining that the load of a cluster exceeds a desired threshold load (e.g., the cluster is experiencing data congestion), the cluster management service may update the cluster-level routing configuration information to reassign at least a portion of the data records that the cluster is designated to receive to another cluster that may have more capacity. For example, the cluster management service may reassign one or more data streams or a portion of a data stream from the overloaded cluster to the other cluster. In some embodiments, rather than transferring data records between existing clusters, the cluster management service may organize a new cluster that has a load capacity that exceeds the load capacity of the overloaded cluster. The cluster management service may then transfer all or a portion of the data records from the overloaded cluster to the new cluster.

According to various embodiments, the system may include a data channel routing service within each cluster. In a helpful comparison, whereas the cluster management service oversees routing of data records to particular clusters, the data channel routing service may manage the routing of data records through particular data channels within the cluster. As described, the cluster may include a set of processing hosts and multiple data channels used to send data records to the processing hosts within the set. In some embodiments, the data channel routing service may route data records to the set of processing hosts through any of the multiple data channels.

In some embodiments, the data channel routing service may receive an incoming data record (e.g., from the cluster management service). In response, the data channel routing service may select one of the multiple data channels in the cluster based on channel-level routing configuration information. The channel-level routing configuration information may indicate routing policies or configurations related to how data records are routed through the data channels. For example, the channel-level routing configuration information may instruct the data channel routing service to send an incoming data record to the set of processing hosts using the data channel with greatest current capacity. In another example, the channel-level routing configuration information may instruct the data channel routing service to route data records to the set of processing hosts by selecting a data channel in a randomized or procedural fashion.

Further, in some embodiments, the data channel routing service may monitor for an indication that a data record channel is or has become congested, such as may occur when the data record channel is handling a volume of data records than it is greater than its desired capacity. In such embodiments, the data channel routing service may update the channel-level routing configuration information to cause that data channel to receive fewer data records in the future.

In an example, the data channel routing service may adjust the distribution percentages of what percentage of data records each data channel receives.

The various embodiments will be described in detail with reference to the accompanying drawings. Wherever possible, the same reference numbers will be used throughout the drawings to refer to the same or like parts. References made to the particular examples and implementations are for illustrative purposes, and are not intended to limit the scope of the invention or the claims.

FIG. 1A illustrates a system 100 for handling or processing streams of data, according to various aspects of the present disclosure. The system 100 may include multiple components for use in processing streams of data, including a cluster management service 110 and multiple data stream processing clusters 112a-112n.

The cluster management service 110 may serve as a frontend of the system 100 by virtue of being in communication with one or more computing devices 102 via a network 104. Those skilled in the art will recognize that the one or more client devices 102 may be any of a number of computing devices that are capable of transmitting and receiving data over a network. Such computing devices may include, but are not limited to, laptop computers, personal computers, personal digital assistants (PDA), hybrid PDAs/mobile phones, mobile phones, smartphones, wearable computing devices, electronic book readers, digital media players, tablet computer, gaming console or controller, kiosk, augmented reality devices, other wireless devices, set-top or other television boxes, and the like. In the example illustrated in FIG. 1A, the one or more computing devices 102 may be in communication with the cluster management service 110 over the network 104 using one or more wired or wireless communication links. For example, the one or more computing devices 102 may communicate over the network 104 to the cluster management service 110 via one or more of an Ethernet cable, Bluetooth®, Wi-Fi, or various other known wired or wireless communication protocols that may be suitable for exchanging information, messages, or instructions. In some embodiments, data records, instructions, information, or other communications may be exchanged between the one or more computing devices 102 and the cluster management service 110 through a common application program interface ("API") or an application or service executing on the cluster management service 110 and the one or more computing devices 102.

In some embodiments, the cluster management service 110 may be in communication with a communication service 105 that may receive data records or other communications from the one or more computing devices 102. The communication service 105 may include one or more computing devices that are configured to receive the data records or other communications from the one or more computing devices 102, such as through a common service or application programming interface available on the one or more computing devices 102 and the communication service 105. In such embodiments, the communication service 105 may forward data records and other communications from the one or more computing devices 102 to the cluster management service 110. For example, the communication service 105 may receive a request for information about a stream of data from a computing device in the one or more computing devices 102, the communication service 105 may forward the request to the cluster management service 110. The cluster management service 110 may obtain the requested information from the data stream processing cluster associated with the data stream indicated in the request, and may send that information to the communication service 105. In response, the communication service 105 may send the requested information about the data stream back to the computing device in the one or more computing device 102 that submitted the request.

The cluster management service 110 may receive streams of data records from the one or more client devices 102 over the network 104. As described above, the data records streams may include a sequence of data records or groups of data records (e.g., data packets, log events, files, etc.). For example, the one or more computing devices 102 may generate a first log event and may send that first log event to the cluster management service 110. At a later time, the one or more computing devices 102 may generate a second log event and send that second log event to the cluster management service 110. In other embodiments, the cluster management service 110 may also receive a stream of data records out of sequential order or in batches of data records that the cluster management service 110 receives as a group.

The network 104 may be any wired network, wireless network, or combination thereof. In addition, the network 104 may be a personal area network, local area network, wide area network, cable network, satellite network, cellular telephone network, etc. or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be private or semi-private networks, such as a corporate or university intranets. The networks 104 may include one or more wireless networks, such as a Global System for Mobile Communications (GSM) network, a Code Division Multiple Access (CDMA) network, a Long Term Evolution (LTE) network, or some other type of wireless network. The network 104 may use protocols and components for communicating via the Internet or any of the other aforementioned types of networks. Protocols and components for communicating via the Internet or any of the other aforementioned types of communication networks are well known to those skilled in the art and, thus, are not described in more detail herein.

The cluster management service 110 may determine that individual data records received from the one or more computing devices 102 (sometimes referred to herein as "incoming data records") are included in the same data stream. For example, the cluster management service 110 may parse an incoming data record to determine identifying information related to the computing device that generated the data record, a user associated with the data record, or the like. For example, the cluster management service 110 may parse an incoming data record to determine a user to which the data record is associated, and the cluster management service 110 may designate each incoming data record associated with the same user as belonging to the same data stream. In this example, the cluster management service 110 may receive a single stream of data from multiple computing devices in the event that these computing devices are sending data records associated with, generated by, or generated on behalf of the same user. The cluster management service 110 may organize data records into streams based on other identifying information, such as by designating data records from the same computing device as belonging to the same data stream, designating data records received within a certain period of time as belonging to the same data stream, and various other factors or combinations of factors.

Thus, in response to receiving an incoming data record from the one or more computing devices 102 and determining a data stream to which the incoming data record belongs, the cluster management service 110 may select one of the multiple data stream processing clusters 112a-112n based at least in part on an association between the data stream of the incoming data record and the selected processing cluster. In particular, according to some embodiments, the cluster management service 110 may reference cluster-level routing configuration information that includes information for routing incoming data records to one or more of the data stream processing clusters 112a-112n.

As described, the cluster management service 110 may route a data stream to the same data stream processing cluster (or the same set of data recording processing clusters) in order to maintain the locality of the data stream. By sending data records from the same data source to the same data stream processing cluster, the cluster management service 110 may ensure that the data records from the same data stream are processed or acted on by the same set of processing hosts. In this embodiment, the cluster management service 110 may avoid a situation in which some of the data stream is processed with one set of processing hosts, another portion of the data stream is processed with another set of processing hosts, and the results generated from each of these sets of processing hosts requires reconciliation.

With continued reference to such embodiments, the cluster-level routing configuration information may include a look-up table or other data structure including associations between data streams and the multiple data stream processing clusters 112a-112n. As such, the cluster management service 110 may reference the cluster-level routing configuration information in order to identify the data stream processing cluster in the multiple data stream processing clusters 112a-112n that is responsible for processing the data stream associated with the incoming data record received from the one or more computing devices 102. As further described (e.g., with reference to FIG. 1B), each data stream processing cluster of the multiple data stream processing clusters 112a-112n may receive data records and may route the data records to a set of processing hosts of the cluster via multiple data channels.

In some embodiments, the data stream processing clusters 112a-112n may send the data records or other data derived from the data records (e.g., metrics data regarding a stream of record data) to one or more backend services 116. The backend services 116 may include one or more computing devices configured to store, processor, or otherwise manage the data records after those data records have been sent through one of the data stream processing clusters 112a-112n. For example, one or more computing devices in the backend services 116 may store the data records according to various types of storage policies, such as a short-term storage of the data records or a long-term archival of the data records. In another example, one or more computing devices in the backend services 116 may perform additional processing of the data records received from the data stream processing clusters 112a-112n.

The cluster management service 110 may receive a request for data records or information regarding a data record stream from the one or more client devices 112a-112n. For example, a computing device may request information regarding certain metrics related to a particular data stream associated with a user of the computing device. In response, the cluster management service 110 may request the data records or information about data streams from the appropriate data stream processing cluster (or clusters) and may forward the data records or data stream information back to the requesting computing device.

In some optional embodiments, the system 100 may further include an optional set of spare processing hosts 114. The set of spare processing hosts 114 may include one or more spare processing hosts that may not be currently assigned to one of the data stream processing clusters 112a-112n. In such embodiments, the cluster management service 110 may, directly or indirectly, obtain performance information from one or more of the data stream processing clusters 112a-112n. For example, the cluster management service 110 may poll the data stream processing clusters 112a-112n, or the data stream processing clusters 112a-112n may send performance information to the cluster management service 110 without receiving a request. In some embodiments, the cluster management service 110 and the one or more data stream processing clusters 112a-112n may indirectly exchange information through another entity. By way of a non-limiting example, one or more of the data stream processing clusters 112a-112n may send performance information to a separate metrics system (not shown), and the cluster management service 110 may request and receive the metrics information from that metrics system. The cluster management service 110 may analyze the obtained information, as well as other information such as the throughput of data streams routed to the cluster, to look for an indication or other evidence that the number or type of processing hosts in the cluster may need to be adjusted. For example, the cluster management service 110 may determine that, based on the performance information or based on the data throughput routed to the cluster, that the cluster may need additional or fewer processing hosts or may need to adjust the types of processing hosts in the cluster. In such embodiments, the cluster management service 110 may modify a table or other data structure that includes information regarding the processing hosts that are currently associated with the one or more data stream processing clusters 112a-112n, such as by creating new entries in the table that indicate that one or more processing hosts may join the cluster (e.g., by advertising new slots) or by modifying existing entries in the table to indicate that one or more processing hosts currently associated with a cluster are no longer part of the cluster. In such embodiments, processing hosts that have been removed from a cluster may join the set of spare processing hosts after determining from the table that they have been removed. Further, the spare processing hosts in the set of spare processing hosts 114 may monitor the table to determine that one or more of the data stream processing clusters 112a-112n has an opening, and the spare processing hosts may join clusters having an opening.

In some embodiments, the one or more processing hosts in a cluster may continually update the table or other data structure to indicate their current operational condition. For example, a processing host associated with the data stream processing cluster 112a may include an update value in the table periodically to indicate that the processing host is still operational. As such, one or more of the spare processing hosts in the set 114 may monitor the table to determine when a processing host in a data stream processing cluster has failed or is performing below a desired or expected performance threshold. Specifically, each spare processing host may monitor for an indication that a processing host of the same type has failed. In response to determining that a processing host has failed (or is underperforming) in a data stream processing cluster, a spare processing host in the set 114 may identify a spare processing host in the set of spare processing hosts 114 that is of the same type as the spare processing host. The spare processing host may then replace the failed processing host, for example, by updating the table of information to indicate that the spare processing host has replaced the failed processing host. Because the processing hosts in the data stream processing clusters 112a-112n and the processing hosts in the set of spare processing hosts 114 communicate their states or conditions, failed processing hosts may be seamlessly replaced, thereby improving the overall performance of the system 100.

While the system 100 is described in the above embodiments as including the cluster management service 110, in some embodiments, the system 100 may include one or more cluster management services that may be configured similarly to the cluster management services 110. In particular, the one or more cluster management services may each receive data records from the one or more computing devices 102 and may route those data records to one or more of the data stream processing clusters 112a-112n. As such, the one or more cluster management services may reference the same cluster-level configuration information in order to coordinate their routing of data records to the data stream processing clusters 112a-112n.

Figure 1B:
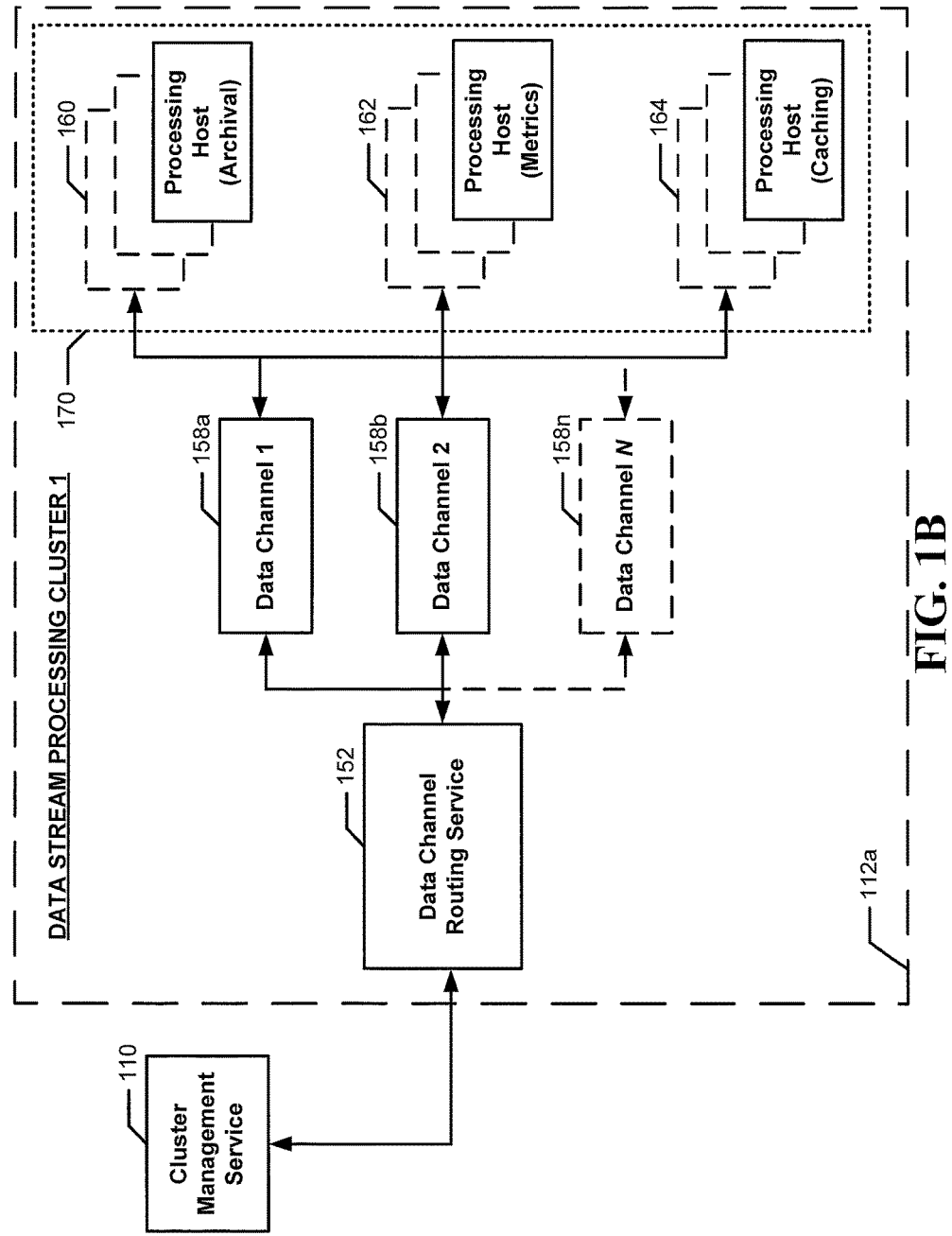
FIG. 1B is a system block diagram of a configuration of a data stream processing cluster, according to some embodiments.

FIG. 1B illustrates a component block diagram of the data stream processing cluster 112a described with reference to the system 100 illustrated in FIG. 1A, according to some embodiments. The data stream processing cluster 112a may include a data channel routing service 152, multiple data channels 158a-158n, and a set of processing hosts 170.

In some embodiments, the data channels 158a-158n may be configured or otherwise characterized by a data throughput metric. For example, the data channel 158a may, for incoming data records being sent to the set of processing hosts 170, handle approximately 1000 transactions per second or 1 MB of data per second of incoming data records. The data channel 158a may, for outgoing data records being sent from the set of processing hosts 170, handle approximately five transactions per second or 2 MB of data per second.

The data channel routing service 152 may be in communication with the cluster management service 110 (e.g., as described with reference to FIG. 1A). In particular, the data channel routing service 152 may receive individual data records from the cluster management service 110. These data records may correspond to one or more data streams that are associated with the data stream processing cluster 112a, and the cluster management service 110 may have routed the data records to the data stream processing cluster 112a based on that association, as described above.

The data channel routing service 152 may generally be responsible for forwarding or routing the data records received from the cluster management service 110 to the set of processing hosts 170 through the multiple data channels 158a-158n. Specifically, for each data record (or batch of data records), the data channel routing service 152 may select one of the data channels 158a-158n and may forward the data record (or batch of data records) to the set of processing hosts 170 through the selected data channel. In some instances, the data channel routing service 152 may make this selection based at least in part on channel-level routing configuration information, which may include one or more policies or rules for routing data records through the multiple data channels 158a-158n. Such policies or rules may include instructions for forwarding a data record to the data channel that currently has the least amount congestion relative to the other data channels in the data stream processing cluster 112a. Alternatively, the channel-level routing configuration information may indicate that data records are to be forwarded to the data channels according to certain proportions. For example, the channel-level configuration information may indicate that the data channel routing service 152 should forward 20% of all data records to the set of processing hosts 170 using the data channel 158a and should forward 15% of all data records using the data channel 158b.

The set of processing hosts 170 may be able to receive a data record regardless of the particular data channel that the data channel routing service 152 selects. Thus, the channel-level routing configuration information may include routing policies that enable the data channel routing service 152 to utilize the available capacity of each of the data channels 158a-158n dynamically to improve overall data throughput of the data stream processing cluster 112a and to reduce the likelihood that one or more of the data channels 158a-158n will become congested or overloaded due to a heavy flow of data records that exceeds the respective desired capacity of those one or more data channels 158a-158n. For example, rather than using the data channel 158a to forward 100% of incoming data records to the set of processing hosts 170 (which may overload the data channel 158a), the data channel routing service 152 may distribute the incoming data records between the data channel 158a and one or more other data channels.

Generally described, the set of processing hosts 170 may include a plurality of processing hosts. The set of processing hosts 170 may provide the same or similar functionality. But, as another example, the set of processing hosts 170 may include one or more different types of processing hosts. For example, the set of processing hosts 170 may include one or more archival hosts 160, one or more metrics hosts 162, and one or more caching hosts 164. In some embodiments, each cluster (e.g., the data stream processing cluster 112a) may be associated with a number of available positions or slots corresponding to a certain number of processing hosts. In some instances, the slots may correspond to a number of processing hosts having a certain type. For example, the data stream processing cluster 112a may be associated with two slots for archival processing hosts, two slots for caching processing hosts, and three slots for metrics-generating hosts. In some embodiments, the cluster management service 110 may update a table or other data structure with information indicating the number of slots (e.g., for each type of processor) associated with a cluster. The cluster management service 110 may further update the table to indicate whether any of the slots of a cluster are open and available for a processing host to join (e.g., from the set of spare processing hosts 114).

In the example illustrated in FIG. 1B, the one or more archival hosts 160 may receive data records via the data channels 158a-158n and may store those data records. Similarly, the one or more caching hosts 164 may also receive and store data records, but in contrast to the one or more archival hosts 160, the one or more caching hosts 164 may store the data records for a relatively shorter period of time and may primarily be used to respond to requests for data records from the one or more computing devices 102. The metrics host 162 may also receive data records via the data channels 158a-158n and may analyze these data records to determine various statistics, metrics, and other information related to individual data records or related generally to data streams. This metrics information may be provided to the one or more computing devices 102 (e.g., in response to receiving a request from the one or more computing devices 102. Additionally (or alternatively), the one or more metrics hosts 162 may provide metrics information to various other processing components (not shown). In some embodiments, the set of processing hosts 170 may include at least three archival hosts 160, at least two caching hosts 164, and at least three metrics hosts 162.

In some embodiments, similar hosts within the set of processing hosts 170 may share processing responsibilities. By way of a non-limiting example in which the set of processing hosts 170 includes two caching hosts, each of the two caching hosts may obtain and cache approximately half of the data records sent through the multiple data channels 158a-158n. However, in some embodiments, similar hosts may distribute processing responsibilities unevenly.

Figures 2A, 2B:
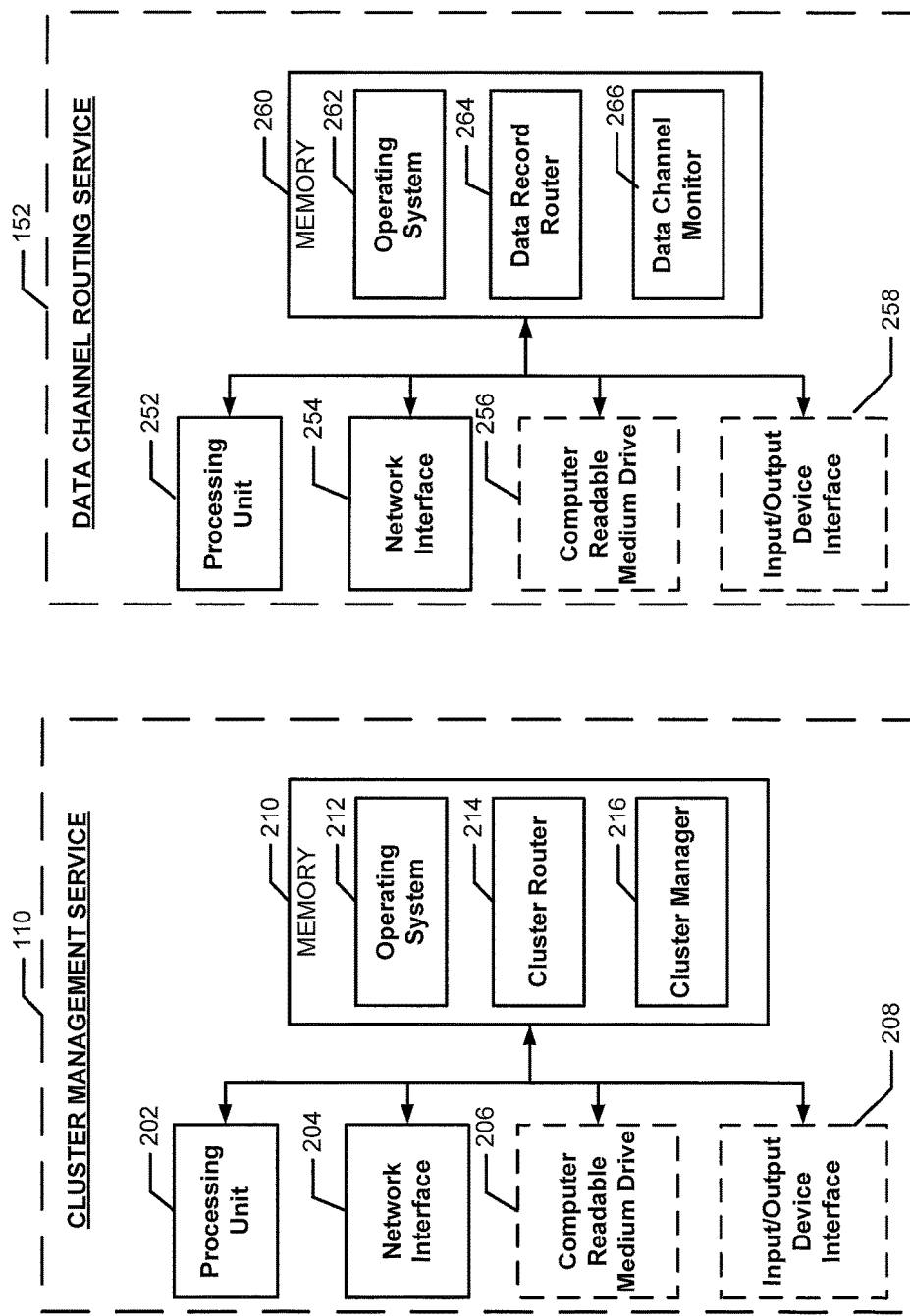
FIG. 2A is a component diagram of an example cluster management service suitable for use with some embodiments.
FIG. 2B is a component diagram of an example data channel routing service of a data stream processing cluster, according to some embodiments.

FIG. 2A depicts a general architecture of the cluster management service 110, which—as described above with reference to FIGS. 1A and 1B—may be configured to route data records to individual data stream processing clusters. The general architecture of the cluster management service 110 depicted in FIG. 2A includes an arrangement of computer hardware and software components that may be used to implement aspects of the present disclosure. The cluster management service 110 may include many more (or fewer) elements than those shown in FIG. 2A. It is not necessary, however, that all of these generally conventional elements be shown in order to provide an enabling disclosure.

As illustrated, the cluster management service 110 includes a processing unit 202, a network interface 204, a computer readable medium drive 206, and an input/output device interface 208, all of which may communicate with one another by way of a communication bus. The network interface 208 may provide connectivity to one or more networks (e.g., the network 104 as described with reference to FIG. 1A) or computing systems and, as a result, may enable the cluster management service 110 to receive and send information and instructions from and to other computing systems or services. For example, the cluster management service 110 may receive data records from one or more computing devices (e.g., the one or more computing devices 102 as described with reference to FIG. 1A) with the network interface 204. The processing unit 202 may also send data records or information related to data streams or data records to the one or more computing devices using the network interface 204.

The processing unit 202 may also communicate to and from memory 210. The memory 210 may contain computer program instructions (grouped as modules or components in some embodiments) that the processing unit 202 may execute in order to implement one or more embodiments. The memory 210 generally includes RAM, ROM, or other persistent, auxiliary, or non-transitory computer-readable media. The memory 210 may store an operating system 212 that provides computer program instructions for use by the processing unit 202 in the general administration and operation of the cluster management service 110. The memory 210 may further include computer program instructions and other information for implementing aspects of the present disclosure. For example, in some embodiments, the memory 210 may include a cluster router 214 and a cluster manager 216, each of which may be executed by the processing unit 202 to perform various operations, such as those operations described with reference to FIGS. 1A, 1B, and 3-5.

In some embodiments, the cluster router 214 may implement one or more aspects of the present disclosure. In response to receiving an incoming data record, the cluster router 214 may refer to cluster-level routing configuration information to select one of multiple data stream processing clusters. For example, the cluster router 214 may determine that the incoming data record is associated with a particular user. The cluster router 214 may perform a look-up operation in the cluster-level routing configuration information using the identity of the user (e.g., a user ID or user name) in order to determine the data stream processing cluster that is associated with that user. The cluster router 214 may then send the data record to the data stream processing cluster that corresponds with the identified user. The routing of data records to clusters will be described in greater detail with regard to FIG. 3.

The cluster manager 216 may perform operations to manage the operations of one or more data stream processing clusters. In some embodiments, the cluster manager 216 may obtain performance information from a data stream processing cluster or information related to a data throughput of one or more data streams associated with the data stream processing cluster. The cluster manager 216 may determine, based at least in part on the obtained performance information or the data throughput information, that a number of processing hosts in the cluster should be increased or decreased or that the number of certain types of processing hosts in the clusters should be changed. The cluster manager 216 may update a table or other data structure that includes information regarding processing hosts that are currently associated with clusters and whether processing hosts may join any of the clusters. As such, processing hosts associated with a cluster may reference the table of information to determine that they have been removed from the cluster (e.g., in response to the determination of the cluster manager 216 to reduce the number or processing hosts in the cluster). Further, the spare processing hosts in the set of spare processing hosts 114 may also reference the table of information to identify clusters that the spare processing hosts may join.

In some embodiments the cluster manager 216 may dynamically modify or update the cluster-level routing configuration information based on changes in the performance of the data stream processing clusters. For example, the cluster manager 216 may obtain load information from a cluster that may indicate the amount of data records/traffic that the cluster is managing in relation to a desired capacity of that cluster. In the event that the cluster manager 216 determines that the cluster is overloaded (e.g., handling more data-record traffic than is desired), the cluster manager 216 may offload at least a portion of the data records that are sent to the overloaded cluster to another cluster that has capacity to handle additional data records. In particular, the cluster manager 216 may update or modify the cluster-level routing configuration to reassign on or more data streams associated with the overloaded cluster to the other cluster. Alternatively (or additionally), the cluster manager 216 may organize a new data stream processing cluster (e.g., a cluster that did not previously exist in the multiple clusters of the system) and may reassign at least a portion of the data records associated with the overloaded cluster to the new cluster.

While the cluster router 214 and the cluster manager 216 are illustrated as distinct modules in the memory 210, in some embodiments, the cluster router 214 and the cluster manager 216 may be incorporated as a module in the operating system 212 or another application or module, and as such, a separate cluster router and a separate cluster manager may not be required to implement some embodiments.

FIG. 2B depicts a general architecture of the data channel routing service 152, which—as described above with reference to FIGS. 1A, 1B, and 2. The general architecture of the data channel routing service 152 depicted in FIG. 2B includes an arrangement of computer hardware and software components that may be used to implement aspects of the present disclosure, and the data channel routing service 152 may include more or fewer elements than those shown in FIG. 2B. In particular, it is not necessary for all of these elements be shown in order to provide an enabling disclosure.

As illustrated, the data channel routing service 152 includes a processing unit 252, a network interface 254, a computer readable medium drive 256, and an input/output device interface 258, all of which may communicate with one another by way of a communication bus. The network interface 258 may provide connectivity to at least the cluster management service 110, the multiple data channels 158a-158n, and a set of processing hosts 170 via a network connection (e.g., as described with reference to FIG. 1B). As such, in some embodiments, the network interface 258 may receive data records from the cluster management service 110 and may forward those data requests to the set of processing hosts 170 via one or more of the multiple data channels 158a-158n.

The processing unit 252 may communicate to and from memory 260. The memory 260 may contain computer program instructions (grouped as modules or components in some embodiments) that the processing unit 252 may execute in order to implement one or more embodiments. The memory 260 may include one or more types of memory, such as RAM, ROM, or other persistent, auxiliary or non-transitory computer-readable media. The memory 260 may store an operating system 262 that provides computer program instructions for use by the processing unit 262 in the general administration and operation of the data channel routing service 152. The memory 260 may further include computer program instructions and other information for implementing some aspects of the present disclosure. For example, in some embodiments, the memory 260 may include a content provider service 264, which may be executed by the processing unit 262 to perform operations, such as those operations described with reference to FIGS. 1A, 1B, 6, and 7.

In some embodiments (e.g., as further described with reference to FIG. 6), the data record router 264 may receive a data record from the cluster management service 110 and may utilize channel-level routing configuration information to select one of the multiple data channels 158a-158n to use in forwarding the data record to one of the processing hosts in the cluster. According to some embodiments (e.g., as further described with reference to FIG. 7), the data channel monitor 266 may update the channel-level routing configuration information to redistribute data record traffic among the multiple data channels 158a-158n, such as in response to determining that one of the load of the data channels is experiencing congestion or relatively high data-record traffic.

While the data record router 264 and the data channel monitor 266 are illustrated as distinct modules in the memory 260, in some embodiments, the data record router 264 and the data channel monitor 266 may be incorporated as a module in the operating system 262 or another application or module (not shown), and as such, a separate data record router 264 or a separate data channel monitor 266 may not be required to implement some embodiments.

Descriptions of various embodiments may refer to the cluster management service 110 and the data channel routing service 152 as separate entities. However, according to some embodiments, the operations described with reference to the cluster management service 110 and the data channel routing service 152 may be performed on one or more of the same computing devices. By way of a non-limiting example, one or both of the cluster management service 110 and the data channel routing service 152 may be implemented within one or more computing devices of the communication service 105 (e.g., as described with reference to FIG. 1A). As such, one or more of the cluster router 214, cluster manager 216, data record router 264, and data channel monitor 266 may be implemented as part of a distributed library of functions available to the one or more computing devices, such as one or more computing devices included in the communication service 105. Thus, references to the cluster management service 110 or the data channel routing service 152 may refer to the modules described with reference to FIGS. 2A and 2B as implemented or executed on one or more of the computing devices included in the communication service 105.

Figure 3:
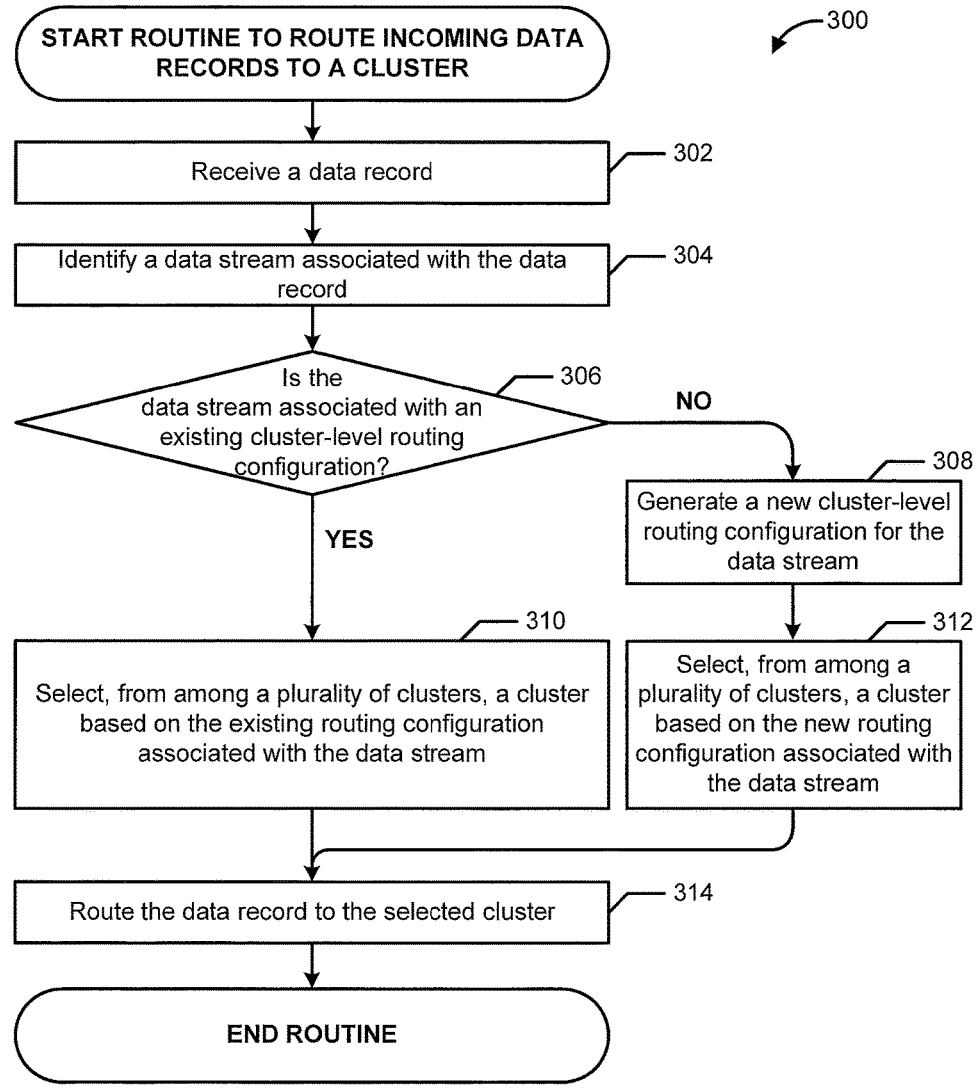
FIG. 3 is a process flow diagram illustrating a computer-implemented method for routing an incoming data record to one of a plurality of data stream processing clusters, according to some embodiments.

FIG. 3 is a process flow diagram of an illustrative routine 300 for routing incoming data records from a cluster management service to individual clusters in a plurality of data stream processing clusters, according to some embodiments. The routine 300 may be implemented with a cluster router operating on a cluster management service (e.g., the cluster router 214 of the cluster management service 110 as described with reference to FIG. 2A).

In block 302, the cluster router 214 may receive a data record, such as from one or more of the computing devices 102 (e.g., as described with reference to FIG. 1A). In an example, the cluster router 214 may be in communication with a computing device and may receive a sequence of log events from the computing device. These log events may correspond to events, user-initiated actions, measurements, or various other occurrences that the computing device has detected, observed, or received. In some embodiments, the one or more computing devices may communicate with the cluster router 214 via a common API, service, or application.

The cluster router 214 may identify a data stream associated with the receive data record, in block 304. As described, related groups of data records may be designated as a data stream. As such, a data stream may represent data records that are commonly associated with the same user, application, computing device, time window, vendor, format, file size, or various other criteria or combinations of criteria. For example, data records associated with the same user may be associated with the same data stream, regardless of whether the data records originate from the same computing device. As such, multiple computing devices may send data records related to the same user to the cluster router 214, and the cluster router 214 may treat these records as belonging to the same data stream.

In decision block 306, the cluster router 214 may determine whether the identified data stream is associated with an existing cluster-level routing configuration. In some embodiments, the cluster router 214 may perform a look-up operating in a look-up table or other data structure that includes information regarding associations between data streams and data stream processing clusters. For example, the cluster-level routing configuration information may indicate that a data stream related to a particular user is associated with a particular data stream processing stream. The cluster-level routing configuration information may be stored locally on the cluster management service 110. In embodiments in which the system includes multiple cluster management services, the cluster-level routing configuration information may be stored at a network location accessible to each of the multiple cluster management services. As such, each of the multiple cluster management services may utilize a common set of instructions for routing data records to the multiple clusters of the system.

In response to determining that the data stream is associated with an existing cluster-level routing configuration (i.e., decision block 306="YES"), the cluster router 214 may select, from among the multiple clusters in the system, a cluster based on the existing cluster-level routing configuration that is associated with the data stream, in block 310.

In response to determining that the data stream is not associated with an existing cluster-level routing configuration (i.e., decision block 306="NO"), the cluster router 214 may generate a new cluster-level routing configuration for the identified data stream, in block 308. In some embodiments, the cluster router 214 may distribute new data streams evenly among the clusters in the system as part of a load-balancing strategy. In such embodiments, the cluster router 214 may obtain performance information from the clusters in the system to determine the current loads or capacities of those clusters. Based on this performance information, the cluster router 214 may identify one or more clusters that may be able to receive and process additional data records without adversely affecting the overall performance of the cluster. In some embodiments, the cluster router 214 may utilize one or more other distribution strategies, such as by assigning the data stream to a cluster by a random selection process, by performing a hashing operation (e.g., hashing a user ID to a particular cluster), or various other distribution techniques.

In some optional embodiments, the cluster router 214 may update the cluster-level routing configuration information with the new routing configuration generated in block 308. Particularly, in response to determining that the data stream is not associated with an existing cluster-level routing configuration (e.g., the data stream has not been previously associated with one or more clusters), the cluster router 214 may store the new cluster-level routing configuration generated in block 308 so that the cluster router 214 may utilize the new cluster-level routing configuration to handle incoming data records associated with the data stream at a later time. For example, once the cluster router 214 has generated the new cluster-level routing configuration for the data stream, the cluster router 214 may determine (e.g., at decision block 306) to use that cluster level routing. As a result, the cluster router 214 (or cluster routers operating on other cluster management services) may utilize the new cluster-level routing configuration when routing future incoming data records from the same stream.

In block 312, the cluster router 214 may select, from among the multiple clusters in the system, a cluster based on the new routing cluster-level configuration generated for the data stream in block 308. For example, the cluster router 214 may associate a cluster with the data stream in block 308 and may select that same cluster in block 312.

Once the cluster router 214 has selected a cluster in block 310 or block 312, the cluster router 214 may route the data record to the selected cluster, in block 314. In some embodiments of the operations performed in block 314, the cluster router 214 may forward the data record to a data record management service operating within the selected cluster, which may in turn forward the data record to one or more processing hosts within the selected cluster via one of multiple data channels. The cluster router 214 may then terminate the routine 300.

Figure 4:
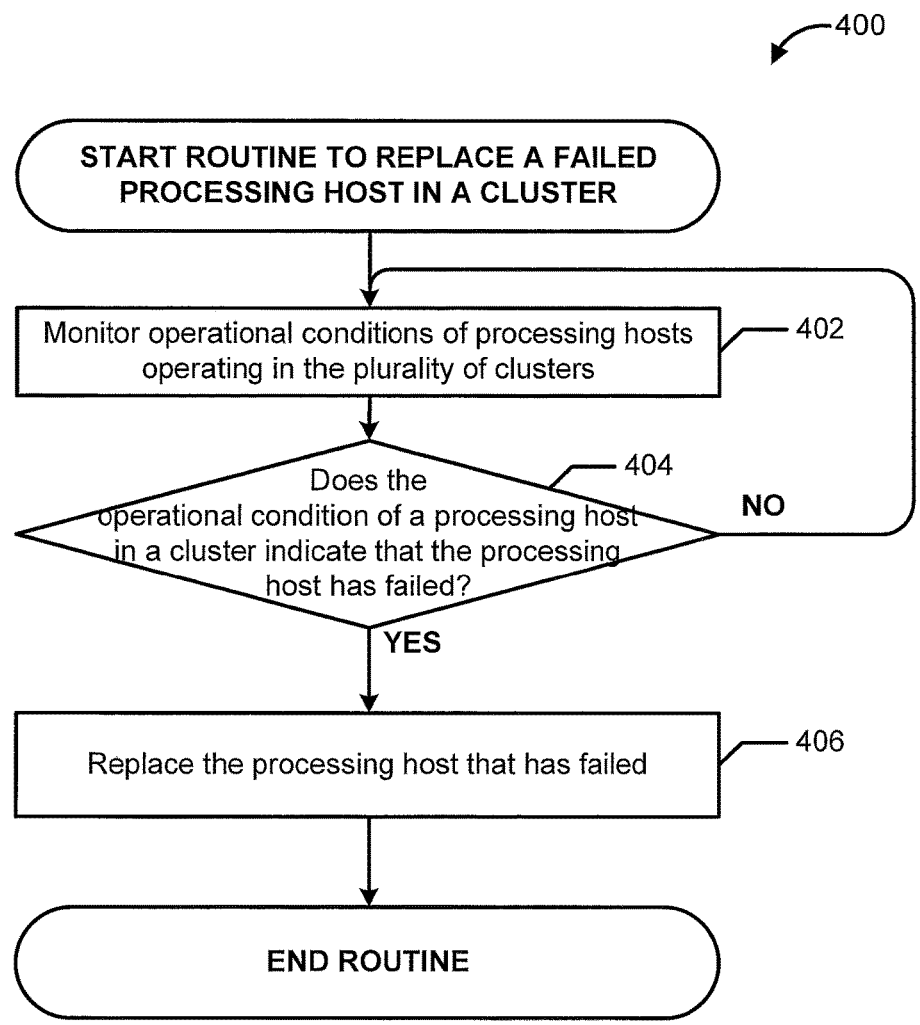
FIG. 4 is a process flow diagram illustrating a computer-implemented method for replacing a failed processing host in a data stream processing cluster, according to some embodiments.

FIG. 4 is a process flow diagram of an illustrative routine 400 for dynamically replacing a failed processing host in a data stream processing cluster, according to some embodiments. The routine 400 may be implemented with one or more of a set of spare processing hosts. By way of illustrative example, the one or more spare processing host may be the set of spare processing hosts 114, as described with reference to FIG. 2A, and may implement routine 400.

In block 402, a spare processing host of the set of spare processing hosts 114 may monitor operational conditions of processing hosts that are operating in the plurality of clusters. In some embodiments, the spare processing host of the set of spare processing hosts 114 may reference a table of values that are continually updated by the processing hosts operating within the plurality of clusters. For example, the table may include time stamps or other periodically updated information that may indicate that the processing hosts in the plurality of clusters are operating normally or are still functional.

The spare processing host of the set of spare processing hosts 114 may determine, in decision block 404, whether the operational condition of a processing host in a cluster indicates that the processing host in the cluster has failed. By way of a non-limiting example, the spare processing host of the set of spare processing hosts 114 may scan the table to determine whether there is a value included in the table that indicates that the processing host in the cluster associated with that value has failed. For example, the spare processing host of the set of spare processing hosts 114 may determine whether a value corresponding to a processing host in a cluster was last updated in excess of a threshold period of time (e.g., a five-minute threshold). In some embodiments, the threshold amount of time may correspond to an expected amount of time that processing hosts are expected to update the values. In some embodiments, the spare processing host of the set of spare processing hosts 114 may monitor for failures of processing hosts in clusters that are of the same type as the spare processing host. For example, the spare processing host of the set of spare processing hosts 114 may be a caching host and thus may only monitor for failures of caching hosts in clusters. As such, the spare processing host of the set of spare processing hosts 114 may only attempt to replace a failed processing host of the same type.

In response to determining that processing hosts in the clusters have not failed (i.e., decision block 404="NO"), the spare processing host of the set of spare processing hosts 114 may perform the above operations in a loop by continuing to monitor the operational conditions of processing hosts until one of the processing hosts has failed. In response to determining that the operational condition of a processing host indicates that the processing host has failed (i.e., decision block 404="YES"), the spare processing host of the set of spare processing hosts 114 may replace the processing host that has failed, in block 406. In some embodiments of the operations performed in block 406, the spare processing host of the set of spare processing hosts 114 may notify the one or more entities in the cluster that the spare processing host is replacing the processing host that has failed. For example, the spare processing host of the set of spare processing hosts 114 may notify the data channel routing service of the cluster or one or more other processing hosts in the cluster that the spare processing host has replaced the failed processing host. The spare processing host of the set of spare processing hosts 114 may then terminate the routine 400.

While some operations of the routine 400 are described as being performed by a spare processing host, each spare processing host in the set of spare processing hosts 114 may perform operations similar to those described above with reference to the routine 400. As a result, each of the spare processing hosts may monitor for information indicating that an opening is available in a cluster and may join a cluster in response to determining that the cluster has an open slot corresponding to a failed processing host.

In some optional embodiments, a data channel routing service (e.g., the data channel routing service 152) may determine when a processing host in a cluster has failed and may proactively cause the spare processing host of the set of spare processing hosts 114 to replace the failed processing host. In such embodiments, the cluster manager 216 may obtain performance information from the cluster. As described, the data channel routing service 152 may be in communication with the set of processing hosts 170 of the data stream processing cluster 112a. As such, the data channel routing service 152 may request performance information from one or more of the set of processing hosts 170 or may make indirect observations about the performance of these components. For example, the data channel routing service 152 may obtain performance metrics from the one or more of the processing hosts in the set 170 and may determine their respective performance (e.g., processing throughput, storage capacity, or the like) based on the obtained performance metrics.

In response to determining that the performance information obtained from the data stream processing cluster 112a indicates that a processing host of the cluster has failed, the data channel routing service 152 may identify a host type of the failed processing host based on the performance information. As described (e.g., with reference to FIG. 1B), the data stream processing cluster 112a may include various different types of processing hosts, such as one or more archiving hosts 160, one or more caching hosts 164, and one or more metrics hosts 162. Accordingly, in such embodiments, the data channel routing service 152 may determine whether the failed or underperforming processing host is an archiving host, a caching host, or a metrics host. In some embodiments, each cluster may have the same or similar number of each type of processing host. As such, the data channel routing service 152 may audit the number of active processing hosts are included in the data stream processing cluster 112a and may identify the failed processing host's type via a process of elimination.

The data channel routing service 152 may notify a spare processing host having the identified host type to replace the processing host of the data stream processing cluster 112a that has failed. Specifically, the data channel routing service 152 may be in communication with one or more spare processing hosts of the set of spare processing hosts 114 that are included in the system but that have not been assigned to any of the clusters in the system. As such, the data channel routing service 152 may identify one of the spare processing hosts of the set of spare processing hosts 114 that has the same host type as the failed/underperforming host in the data stream processing cluster 112a, and the data channel routing service 152 may instruct that spare processing host to join the cluster as a replacement for the failed or underperforming host. In some embodiments, the data channel routing service 152 may instruct the failed or underperforming host to cease participating in the cluster.

Figure 5:
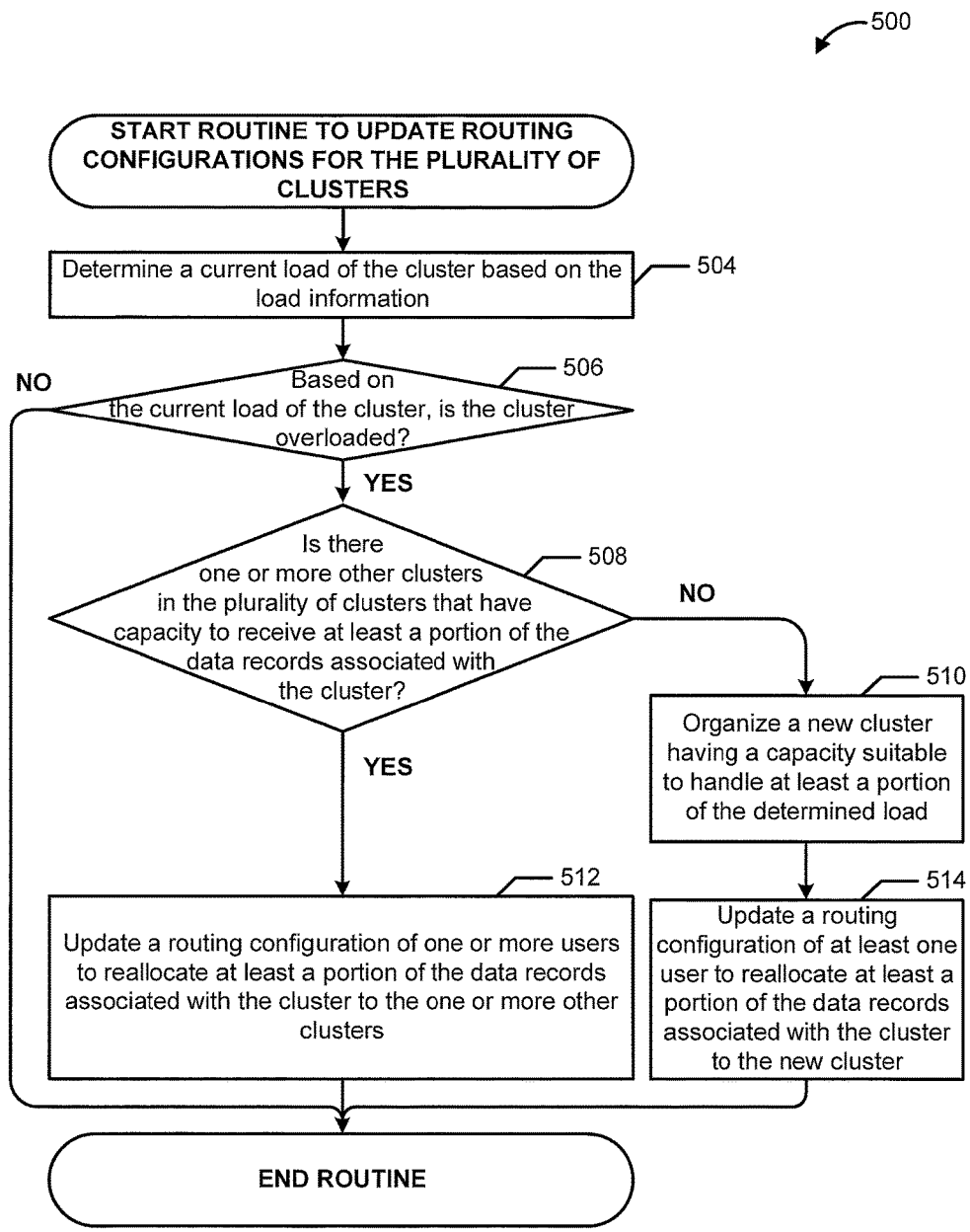
FIG. 5 is a process flow diagram illustrating a computer-implemented method for updating routing configurations for data stream processing clusters, according to some embodiments.

FIG. 5 is a process flow diagram of an illustrative routine 500 for updating cluster-level routing configuration information, according to some embodiments. The routine 500 may be implemented with a cluster manager operating on a cluster management service (e.g., the cluster manager 216 of the cluster management service 110 as described with reference to FIG. 2A).

In block 504, the cluster manager 216 may determine a current load of a data stream processing cluster. In some embodiments of the operations performed in block 504, the cluster manager 216 may obtain performance information from a cluster, such as by performing operations similar to the operations described with reference to block 402 of the routine 400. The cluster manager 216 may analyze the performance information to determine an amount of data records that the cluster is handling, processing, or receiving. The cluster manager 216 may also, or alternatively, determine various metrics regarding how quickly the cluster is able to process data records, whether there is any indication of congestion (e.g., slow data throughput), and the like. Additionally, in some embodiments of the operations performed in block 504, the cluster manager 216 may monitor or obtain information regarding the data throughput of one or more data stream that are associated with the cluster. The cluster manager 216 may utilize the data throughput information to determine whether the cluster is overloaded, for example, by determining whether the data throughput of the data streams associated with that cluster exceed a threshold data throughput.

In decision block 506, the cluster manager 216 may determine whether the cluster is overloaded based on the current load of the cluster. In some embodiments, the cluster manager 216 may compare the performance of the cluster with a desired performance threshold to determine whether the cluster is overloaded. For example, the cluster manager 216 may determine that the cluster is overloaded in the event that the amount of data records that the cluster is handling, processing, or receiving is higher than a threshold amount of data records. The cluster manager 216 may similarly use one or more thresholds, additionally or alternatively, such as thresholds based on data throughput, processing efficiency or speed, and the like.

In response to determining that the cluster is overloaded (i.e., decision block 506="YES"), the cluster manager 216 may further determine, at decision block 508, whether there is one or more other clusters in the plurality of cluster that have capacity to receive at least a portion of the data records associated with the cluster. In some embodiments, the cluster manager 216 may perform operations such as those performed above in blocks 504-506 for the one or more other clusters to determine whether there is another cluster that is not overloaded. In some embodiments, the cluster manager 216 may identify one or more other clusters that have the greatest capacity to handle additional data records.

In response to determining that there are one or more other clusters in the plurality of clusters that have capacity to receive at least a portion of the data records associated with the cluster (i.e., decision block 508="YES"), the cluster manager 216 may update a routing configuration of one or more users to reallocate at least a portion of the data records associated with the cluster to the one or more other clusters, in block 512.

In response to determining that there is not another cluster in the plurality of clusters that has capacity to receive at least a portion of the data records associated with the cluster (i.e., decision block 508="NO"), the cluster manager 216 may, in block 510, organize or create a new cluster such that the new cluster has a capacity suitable to handle at least a portion of the load of the overloaded cluster. In some embodiments, the cluster manager 216 may organize the new cluster using components included in the spare processing hosts (e.g., the spare processing hosts 114 as described with reference to FIG. 1A). In block 514, the cluster manager 216 may update channel-level routing configuration information to reallocate a least a portion of the data records associated with the overloaded cluster to the new cluster organized in block 510.

In response to updating the channel-level routing configuration information in block 514 or, alternatively, in response to updating the channel-level routing configuration information in block 512, the cluster manager 216 may cease performing the routine 500.

Figure 6:
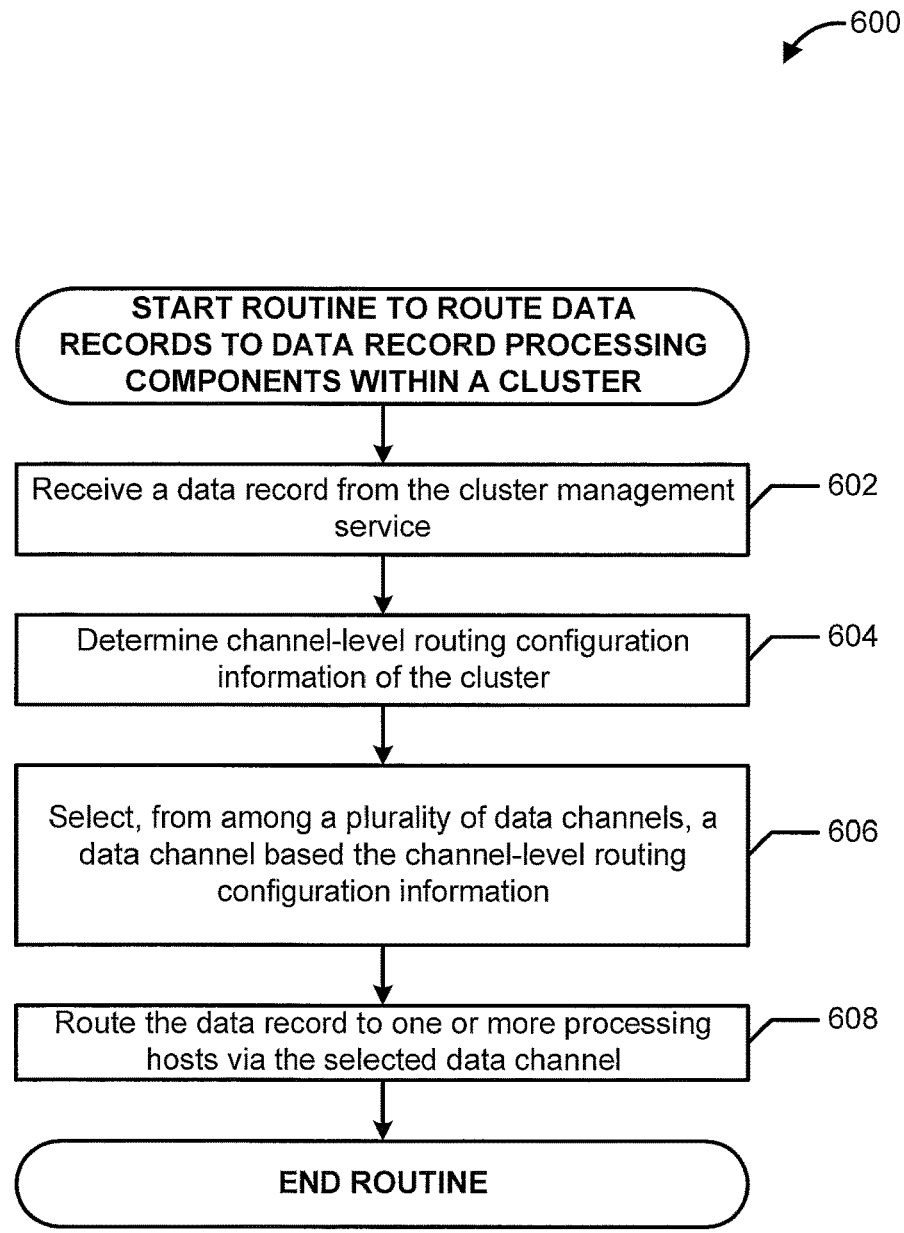
FIG. 6 is a process flow diagram illustrating a computer-implemented method for routing data records to individual channels within a data stream processing cluster, according to some embodiments.

FIG. 6 is a process flow diagram of an illustrative routine 600 for routing data records through data channels in a data stream processing cluster, according to some embodiments. The routine 600 may be implemented with a data record router operating on a data channel routing service (e.g., the data record router 264 of the data channel routing service 110 as described with reference to FIG. 2B).

In block 602, the data record router 264 may receive a data record from a cluster management service (e.g., the cluster management service 110 as described with reference to FIGS. 1A, 1B, and 2A). In response, the data record router 264 may determine a channel-level routing configuration of the cluster to which the data record router 264 belongs, in block 604. As described, the channel-level routing configuration may include one or more rules, instructions, or other information indicating how to route a data record through one of the multiple data channels of the cluster to the one or more processing hosts within the cluster.

In block 606, the data record router 264 may select, from a plurality of data channels, a data channel based on the channel-level routing configuration information determined in block 604. For example, in the event that the channel-level routing configuration information includes a policy for selecting a data channel at random or based on a probability distribution, the data record router 264 may, accordingly, select one of the multiple data channels in a random or probabilistic fashion. In block 608, the data record router 264 may route the data record to one or more processing hosts of the cluster via the data channel selected in block 606, as described. The data record router 264 may then terminate the routine 600.

Figure 7:
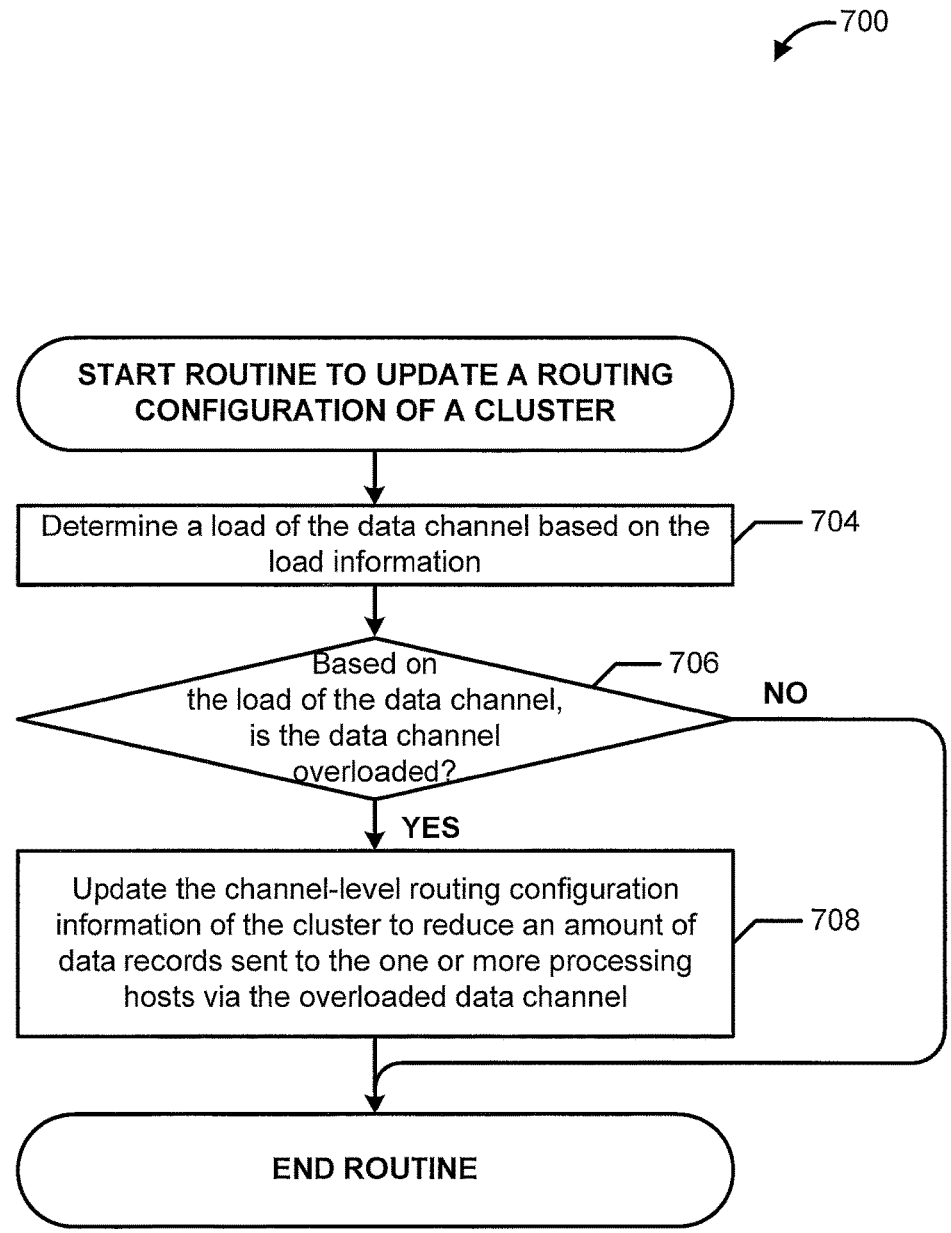
FIG. 7 is a process flow diagram illustrating a computer-implemented method for updating a routing configuration related to channels within an individual data stream processing cluster, according to some embodiments.

FIG. 7 is a process flow diagram of an illustrative routine 700 for updating channel-level routing configuration information, according to some embodiments. The routine 700 may be implemented with a data channel monitor operating on a data channel routing service (e.g., the data channel monitor 264 of the data channel routing service 110 as described with reference to FIG. 2B).

In block 704, the data channel monitor 264 may determine a load of a data channel. In some embodiments, the data channel monitor 264 may monitor an amount of time that it takes to send a data record through a data channel to a processing host. The data channel monitor 264 may also, or alternatively, determine the load of the data channel based on an amount or volume of data records or a rate of data records that the data channel is currently handling. As such, at decision block 706, the data channel monitor 264 may determine whether the data channel is overloaded based on the load of the data channel as determined in block 704. By way of a non-limiting example, the data channel monitor 264 may compare the volume or rate of data records that the data channel is handling to a maximum capacity associated with the data channel. In some embodiments, the data channel monitor 264 may determine that the data channel is overloaded in the event that the percentage or ratio of the actual load to the maximum capacity exceeds a desired threshold. For example, the data channel monitor 264 may determine that the data channel is overloaded in the event that the data channel's actual load is 50% of a maximum capacity of the data channel.

In response to determining that the data channel is overloaded (i.e., decision block 706="YES"), the data channel monitor 264 may update the channel-level routing configuration information of the channel, in block 708. In some embodiments of the operations performed in block 708, the data channel monitor 264 may modify the channel-level routing configuration information to reduce an amount of data records that are sent to the one or more processing hosts via the data channeled determined to be overloaded. Specifically, the data channel monitor 264 may update the channel-level routing configuration information to reduce the likelihood that the data channel will be selected to handle data records in the future, while increasing the likelihood that one or more other data channels will be selected to handle data records in the future.

In response to updating the channel-level routing configuration information in block 708 or, alternatively, in response to determining that the data channel is not overloaded (i.e., decision block 706="NO"), the data channel monitor 264 may cease performing operation of the routine 700.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

Any process descriptions, elements or blocks in the flow diagrams described herein or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:
1. A system comprising:
   a cluster management service comprising:
      a first processor in communication with a first memory, the first memory storing processor-executable instructions that cause the first processor to perform operations comprising:
         receiving a data record from a computing device, the data record comprising one of a plurality of log events of a data stream associated with the computing device;
         determining a user associated with the data record;
         determining a cluster-level routing configuration associated with the user;
         selecting, from among a plurality of data stream processing clusters, a data stream processing cluster based at least in part on the cluster-level routing configuration associated with the user; and
         forwarding the data record to a data stream processing cluster; and
   the data stream processing cluster comprising:
   one or more processing hosts, and
      a second processor in communication with a second memory storing processor-executable instructions that cause the second processor to perform operations comprising:
         receiving, from the cluster management service, the data record;
         determining a channel-level routing configuration of the data stream processing cluster, wherein the channel-level routing configuration includes instructions to route received data records to one of a plurality of data channels based at least in part on respective loads of the plurality of data channels, a randomized distribution of data records across the plurality of data channels, or a hashing operation using the data record;
         selecting, from the plurality of data channels exclusive to the data stream processing cluster, a data channel based at least in part on the channel-level routing configuration of the cluster; and
         forwarding the data record to the data channel.

2. The system of claim 1, wherein the cluster-level routing configuration associated with the user includes information to route data records associated with the user to the data stream processing cluster.

3. The system of claim 2, wherein the cluster-level routing configuration associated with the user further includes information not to route data records associated with the user to other data stream processing clusters of the plurality of data stream processing clusters.

4. The system of claim 1, wherein the one or more processing hosts are configured to perform operations comprising:
   obtaining, from the data channel, the data record, and
   performing at least one of archiving the date record, caching the data record, or determining metrics based at least in part on the data record.

5. The system of claim 4, wherein the one or more processing hosts are not included in another data stream processing cluster of the plurality of data stream processing clusters.

6. A computer-implemented method comprising:
   selecting, by a cluster management service, from a plurality of data stream processing clusters, a data stream processing cluster based at least in part on a first routing configuration;
   forwarding, by the cluster management service, a data record to the data stream processing cluster, the data record comprising one of a plurality of log events of a data stream associated with a computing device;

determining, by the data stream processing cluster, a second routing configuration associated with a plurality of data channels included in and exclusive to the data stream processing cluster, wherein the second routing configuration includes instructions to route received data records to one of the plurality of data channels based at least in part on respective loads of the plurality of data channels, a randomized distribution of data records across the plurality of data channels, or a hashing operation using the data record;

selecting, by the data stream processing cluster, a data channel from the plurality of data channels, based at least in part on the second routing configuration; and forwarding, by the data stream processing cluster, the data record through the data channel to a processing host included in the data stream processing cluster.

7. The computer-implemented method of claim 5, wherein the first routing configuration comprises information regarding an association between the data stream processing cluster and at least one of a sender of the data record, an owner of the data record, a data stream of the data record, an attribute of the data record, or metadata of the data record.

8. The computer-implemented method of claim 5, wherein selecting, from a plurality of data stream processing clusters, a data stream processing cluster based at least in part on a first routing configuration comprises:
determining a user associated with the data record; and
selecting the data stream processing cluster based on the information regarding the association between the user and the data stream processing cluster.

9. The computer-implemented method of claim 5, wherein the second routing configuration comprises one or more rules for forwarding data records through the plurality of data channels.

10. The computer-implemented method of claim 5, wherein:
the data stream processing cluster further comprises one or more processing hosts; and
the method further comprises providing, from the data channel, the data record to the one or more processing hosts.

11. The computer-implemented method of claim 5, wherein the one or more processing hosts of the data stream processing cluster are not included in another data stream processing cluster of the plurality of data stream processing clusters.

12. The computer-implemented method of claim 5 further comprising:
determining that the processing host of the cluster has failed; and
replacing the processing host of the cluster that has failed with a spare processing host.

13. The computer-implemented method of claim 12, wherein determining that the processing host of the cluster has failed comprises:
obtaining information related to an operational condition of the processing host;
determining that the information indicates that the processing host has failed.

14. The computer-implemented method of claim 5 further comprising:
receiving performance information associated with the data stream processing cluster;
determining, based at least in part on the performance information, a change in processing hosts associated with the data stream processing cluster; and
updating, based at least in part on the change in processing hosts, information regarding one or more processing hosts associated with the data stream processing cluster.

15. The computer-implemented method of claim 5, wherein selecting, from a plurality of data stream processing clusters, a data stream processing cluster based at least in part on a first routing configuration comprises:
determining a user associated with the data record;
determining that the user is not associated with an existing routing configuration related to the plurality of data stream processing clusters; and
generating a new routing configuration associated with the user, wherein the new routing configuration includes information designating the data recording processing cluster to receive data records associated with the user.

16. The computer-implemented method of claim 15, wherein generating the new routing configuration associated with the user comprises utilizing a hashing function to map data record associated with the user to the data stream processing cluster.

17. The computer-implemented method of claim 15, wherein the data stream is a log stream.

18. A computer-implemented method comprising:
receiving, by a data stream processing cluster, a data record comprising one of a plurality of log events of a data stream associated with a computing device, the data stream processing cluster selected based on a first routing configuration;
determining, by the data stream processing cluster, a second routing configuration associated with a plurality of data channels included in and exclusive to the data stream processing cluster, wherein the second routing configuration includes instructions to route received data records to one of the plurality of data channels based at least in part on respective loads of the plurality of data channels, a randomized distribution of data records across the plurality of data channels, or a hashing operation using the data record;
selecting, by the data stream processing cluster, a data channel from the plurality of data channels, based at least in part on the second routing configuration; and
forwarding, by the data stream processing cluster, the data record through the data channel to a processing host included in the data stream processing cluster.

19. The method of claim 17, wherein the first configuration information indicates an association between the data and the data stream processing cluster.

20. The method of claim 17 further comprising:
obtaining, from the data stream processing cluster, information related to an amount of the data from the one or more users that the data stream processing cluster is currently processing;
determining a data processing capacity of the data stream processing cluster; and
determining that the amount of data that the data stream processing cluster exceeds the data processing capacity of the data stream processing cluster.

21. The method of claim 20 further comprising:
determining that another data stream processing cluster in the plurality of data stream processing clusters is processing an amount of data that does not exceed a data processing capacity of the other data stream processing cluster; and generating an updated routing configuration that re-assigns at least a portion of the data from the one or more users from the data stream processing cluster to the other data stream processing cluster.

22. The method of claim 20 further comprising:

organizing a new data stream processing cluster, wherein a data processing capacity of the new data stream processing cluster is greater than the data processing capacity of the data stream processing cluster; and generating an updated routing configuration that reassigns at least a portion of the data from the one or more users from the data stream processing cluster to the new data stream processing cluster.

* * * * *